Oct. 13, 1942.  R. H. NISBET ET AL  2,298,626
GYROSCOPIC INDICATOR
Filed Jan. 20, 1940  2 Sheets-Sheet 1

Inventors
ROBERT HAYES NISBET
WILLIAM GEORGE HARDING,
by
Herbert H. Thompson.
THEIR Attorney

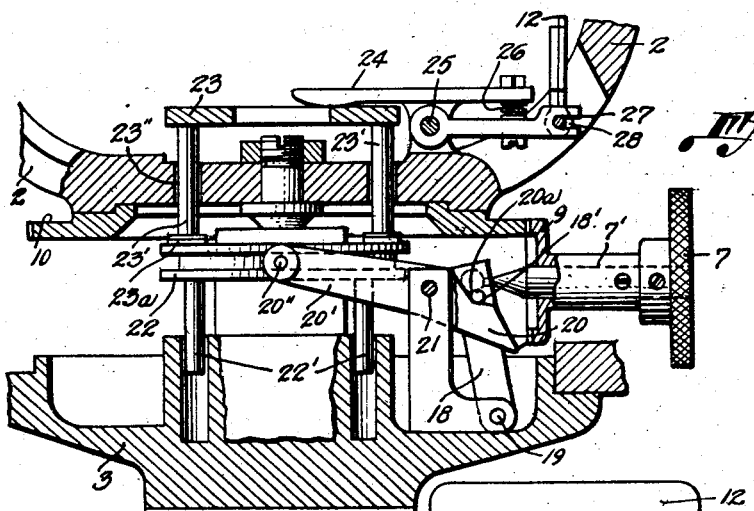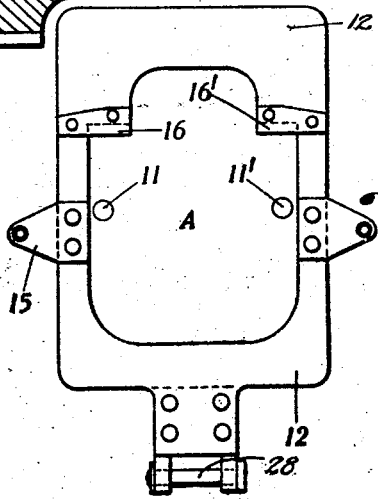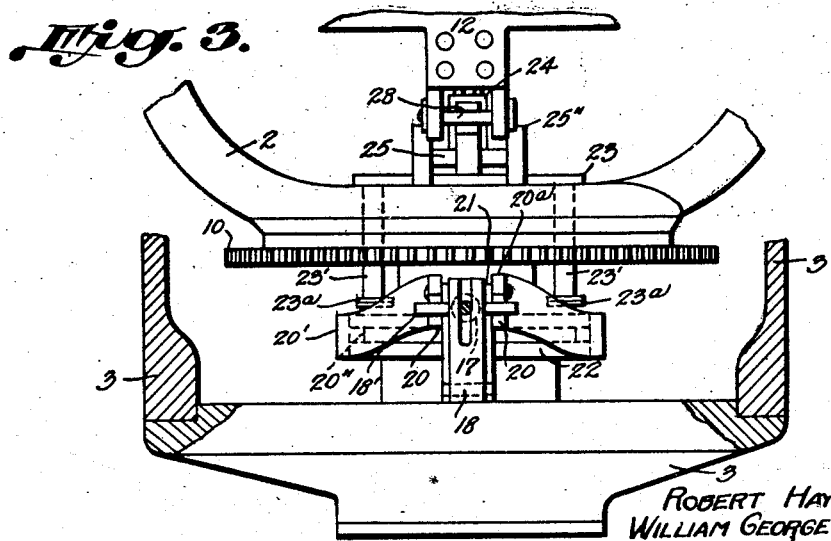

Patented Oct. 13, 1942

2,298,626

UNITED STATES PATENT OFFICE 2,298,626

GYROSCOPIC INDICATOR

Robert Hayes Nisbet, Osterley, and William George Harding, Whitton, England, assignors to Sperry Gyroscope Company Incorporated, Brooklyn, N. Y., a company of New York Application January 20, 1940, Serial No. 314,834
In Great Britain January 23, 1939

4 Claims. (Cl. 74—5)

This invention relates to azimuth or "directional" gyroscopes, and particularly, to means for "caging" such gyroscopes with, if desired, co-acting "setting" means. By "setting" is meant the process of turning the vertical Cardan frame in order to set a new course, or to re-set the course after the gyroscope has wandered, and by the term "caging" as used in connection with a directional gyroscope is meant the process of bringing the rotor bearing frame into a definite position in relation to the Cardan frame and locking it there when desired, e. g., during the process of setting the gyroscope.

Various devices for caging directional gyroscopes are known. In these known devices means are provided on the vertical Cardan ring which are movable thereon to engage with the rotor bearing frame to force it towards a predetermined position with respect to the Cardan ring. These means must be operated from outside the Cardan ring, e. g., by a manually operated knob adapted to be pushed or pulled by the operator. It is therefore necessary to provide means to make the operation independent of the azimuth position of the vertical ring.

The present invention consists in caging means for a Cardan-mounted directional gyroscope comprising means for applying a torque to the rotor case or bearing frame, and frictional means for providing a torque adapted to prevent unassisted movement of the Cardan ring about its vertical axis whereby the rotor is moved relatively to the Cardan ring to bring the spinning axis to a horizontal position.

The invention further consists in caging means for a Cardan-mounted directional gyroscope comprising a member movable substantially parallel to the vertical axis of the vertical ring of the Cardan mounting, means to prevent rotation of said member about the vertical axis of the gyroscope, and means for opposing or preventing unassisted rotation of the said vertical ring in relation to said vertically movable member, when the gyroscope is caged.

The invention, by opposing the tendency of the gyro to precess round the vertical axis when the caging mechanism applies torques round the horizontal axis, ensures that these torques cause movement about the horizontal axis as desired to cage the gyroscope. The tendency to precess round the vertical axis which is overcome by the invention is particularly noticeable in large gyroscopic instruments, and the difficulties and inconveniences in operation which result therefrom are of some importance, even if they are not very serious in small instruments of the kind used in aircraft.

In a preferred form of the present invention the vertically movable member is prevented from rotating round the vertical axis by guides which permit only vertical movement. The contact surfaces of the vertically-movable member and of the member on the vertical ring with which it makes contact are designed or treated so that, when engaged, they oppose relative rotation by a considerable frictional torque. The frictional restraint on relative movement about a vertical axis, between the vertical ring and the vertically-movable member when the latter is in the caging position, is overcome when the vertical ring is forcibly rotated about the vertical axis to reset it or to set a new course.

In order that the invention may be fully understood and carried into effect an embodiment thereof (given, however, merely by way of example) will now be described with reference to the accompanying drawings, in which—

Figure 2 shows in detail the caging plate used in the embodiment shown in Figure 1.

Figure 3 is a detail, partly in section, looking in the direction of the arrows 3—3 of Fig. 1.

Figure 4 is a detail of Fig. 1 in section showing a portion of the caging and setting mechanism in its operated position.

Figure 1:
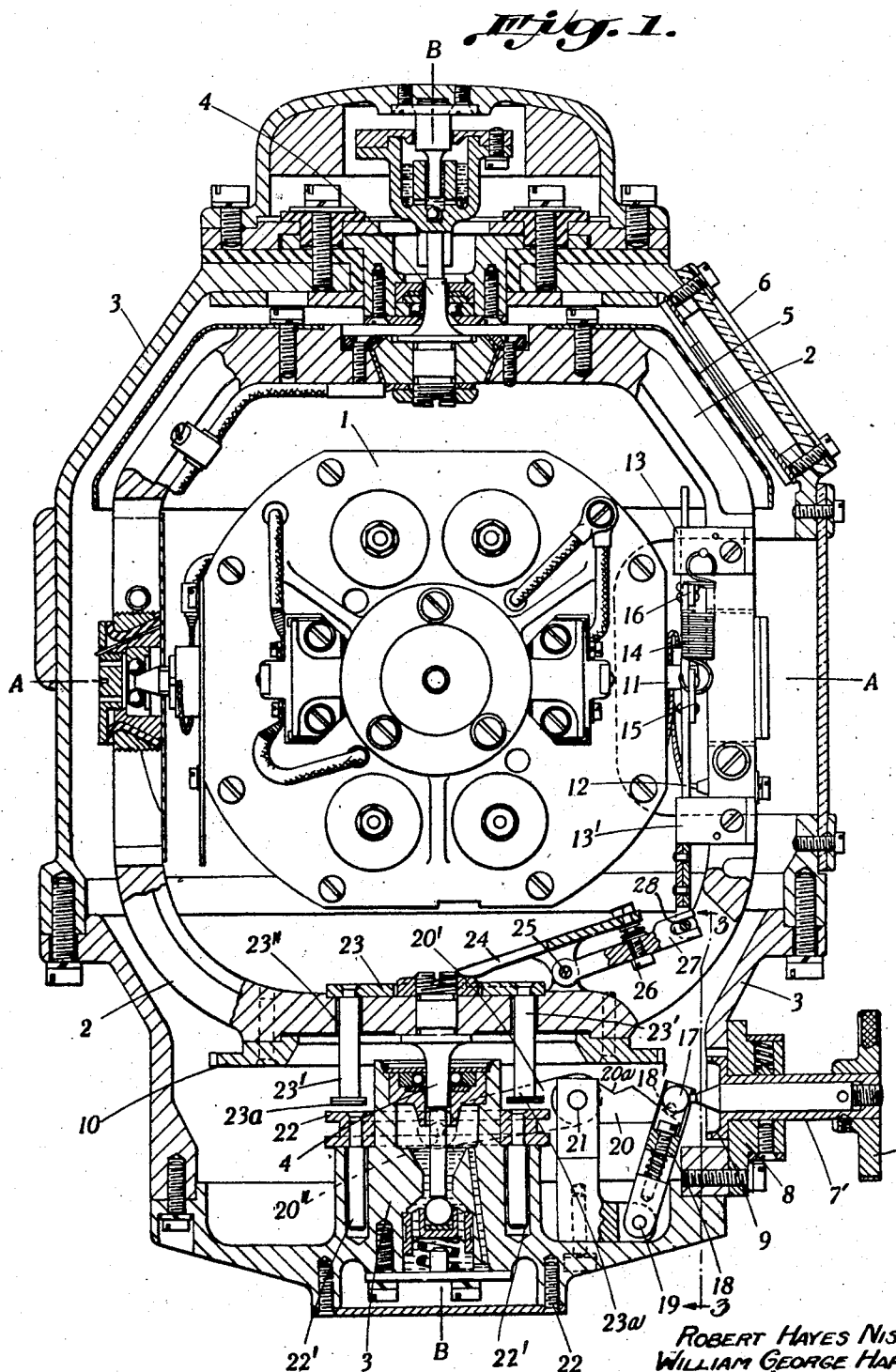
Figure 1 is a part-sectional front elevation of a directional gyroscope of the type described in our prior Patent No. 2,269,103, dated January 6, 1942, for Gyroscopic instruments.

In carrying the invention into effect in one convenient manner as shown in the accompanying drawings, the rotor case 1 is supported by the vertical Cardan ring 2 for tilt about the axis AA. The main frame 3 carries the Cardan ring 2 by means of pivots at 4 and 4 for rotation about the normally vertical axis BB. A compass card 5 is carried by the Cardan ring 2 and is viewed through the window 6.

A knob 7 for "caging" and "setting" the gyroscope is attached to the outer end of a spindle 7' which is rotatably and slidably mounted in the main frame at 8 so that it can be manually moved inwards in the axial direction of spindle 7' and can then be manually rotated to set the gyroscope about its vertical axis BB for a desired course by means of a crown wheel 9 attached to the spindle 7' which enters into engagement with a toothed horizontal wheel 10 attached to the Cardan ring.

The rotor case 1 is provided with two hardened pins 11, 11' which are symmetrically situated on and secured to it on each side of the axis AA. A caging plate 12 as shown in Figure 2 is mounted on the Cardan ring 2 with freedom to slide vertically within four guides, two of which are shown at 13, 13'; this plate is normally held in its extreme upward position by springs one of which is shown at 14 connected between the guide bracket 13 and the arm 15 attached to the side of the caging plate.

When the plate 12 is moved downwards one or other (depending on the direction of tilt of the rotor axis relatively to the Cardan ring 2) of two hardened steel strips 16, 16' secured to the plate 12 comes into contact with the corresponding pin 11 or 11' on the rotor case with the result that the rotor case is ultimately caged in an upright position, as hereinafter explained.

When the knob 7 is pushed inwards a ball 17 formed at the inner end of spindle 7' moves the upper end of a pin-carrier 18 which is pivoted at 19. Horizontal coaxial pins (one of which is shown dotted at 18') rigid with this pin-carrier are thereby pushed along the respective upper surfaces of two projecting arms 20 of a member 20—20' which is pivoted at 21. In the position in which the knob 7 is pushed fully inwards the pins 18' rest in notches 20a in the upper surface of the arms 20, which act as a detent. The pivot 19 of the pin-carrier 18 takes the component of the reaction between the arms 20 and the pins 18' directed radially from the pin 19, thus substantially relieving spindle 7' from transverse forces.

The member 20—20' has a somewhat H-like form, its pivot 21 corresponding to the cross-bar of the H, the arms 20 corresponding to the lower ends of the parallel legs of the H, and the arms 20' corresponding to the upper ends of the legs of the H. The arms 20' have pins 20" projecting from their ends which engage in a groove in a vertically movable ring 22. This ring is slidably mounted on the main frame 3 so that it moves vertically when the arms 20 are depressed. It is, however, prevented from rotating about the vertical axis by legs 22' slidable vertically in holes in the main frame or casing 3.

A plunger member 23 is located on the vertical Cardan ring 2 symmetrically above the vertically movable member 22 and is provided with downwardly projecting legs 23' which pass through vertical holes 23" in the Cardan ring 2. These legs compel the member 23 to turn with the Cardan ring but allow it to move parallel to the vertical axis BB. They are preferably provided with leather pads 23a at their lower ends, although other means for increasing the friction between these ends and the member they engage may be used such as roughening the surfaces. The engaging surfaces may also be made conical in form to increase the normal reaction between them and thus increase the frictional torque which may be transmitted.

When the knob 7 is pushed inwards the ring 22 is raised and comes into contact with the legs 23' thereby raising the plunger member 23 to operate the parts of the caging means which are carried by the Cardan ring. These parts consist of a lever 24 pivoted at 25 to the Cardan ring, the other end of this lever being connected by means of a spring 26 to a forked lever 27. The latter is freely pivoted at one end at 25, while its other end is forked to engage permanently a bolt 28 rigidly connected to the caging plate 12. In this way inward movement of knob 7 applies a downward force to plate 12 which, as explained below, ultimately causes the plate to move down into its caging position and thereby cage the bearing frame 1 in a position perpendicular to the plane of the Cardan ring 2. The spring 26 confers a small amount of resilient freedom to the caging mechanism. By virtue of this the pins 18' are enabled to ride over the lip of the notch 20a to enter or leave this notch, the additional movement imparted thereby to the arm 20, ring 22, plunger member 23, and lever 24, causing the spring 26 to be compressed. Spring 26 and notch 20a thus act as a spring detent holding the knob 7 in its inner position when it is once placed there. This spring serves another useful function when the knob 7 is turned for setting the gyroscope after the gyroscope has been caged. The torque thus applied about the vertical axis by the knob 7 causes the rotor case to precess about its horizontal axis. In doing so the spring 26 is compressed, and its resistance to this precession applies the actual torque that causes the gyroscope to turn round the vertical axis. By thus employing a resilient member instead of a rigid one to resist precession about the horizontal axis and produce precession round the vertical axis, the forces exerted on the bearings of the gyroscope are kept low.

If the rotor case is in a tilted position relative to the Cardan ring before being caged the initial part of the caging process is as follows:

A downward force on the pin 11 or 11' applied by the plate 12 applies a torque about axis AA to the rotor. This torque tends to cause the rotor case and Cardan ring to precess about axis BB, but such precessional movement is prevented or opposed by the friction at the contact between the ring 22 and the pads 23a on the legs 23' of plunger member 23. This frictional force exerts a torque on the vertical ring round the vertical axis with the result that the rotor bearing frame precesses about the axis AA. The total effect is that the rotor bearing frame is forcibly brought into position where the rotor axis is perpendicular to the plane of the vertical ring, in which position the strips 16, 16' engage both of the corresponding pins 11, 11'.

The springs 14, 14' return the caging plate 12 to its extreme upward position when the knob 7 is returned to its outward position and they also operate to ensure that there is sufficient pressure and therefore sufficient friction at the contact between the upper surface of the member 22 and the pads 23a on legs 23' while caging is being brought about.

When the knob 7 is withdrawn the crown wheel 9 disengages from the toothed horizontal wheel 10 and the caging plate 12 is raised by springs 14, 14' thereby immediately freeing the rotor case from being caged since the pins 11, 11' are disengaged substantially simultaneously from the strips 16, 16' attached to the plate 12 and at a slight interval of time before the frictional contact at 22—23' ceases. One advantage of this order of release is that it overcomes a defect frequently appearing in the release of caging mechanism, namely, that if the mechanism is released when the craft is undergoing rotational movement which has any component partly about the axis of support of the rotor bearing frame, the caging mechanism is apt to disturb the gyroscope. Thus, in the present embodiment in the conditions assumed, one of the strips 16, 16' would, in the absence of an opposing torque, press on its associated pin 11, or 11', and cause the rotor to precess about the axis BB. Any such tendency of the gyroscope to precess is opposed in the present invention by the friction at contact 22—23a since this friction is maintained for a short time after the plate 12 has commenced to rise. Thus any error which may arise in such a case is expressed as a slight tilt of the rotor instead of as a change in the azimuth position set for the gyroscope.

It should be understood that the invention is not limited to the details of the form described above since various modifications may be introduced, as they become desirable in order to carry the invention into effect under different conditions and requirements which have to be fulfilled, without departing from the scope of the invention.

What we claim is:

1. In a caging device for a Cardan ring supported directional gyroscope having a rotor and rotor bearing case and wherein the Cardan ring is mounted to turn on a vertical axis, a yielding caging element for applying a torque to the rotor bearing case adapted to position the spin axis of the rotor of the gyroscope in prependicular relation to the Cardan ring, means adapted to frictionally retain the Cardan ring against movement about its vertical axis, a yielding connection between said element and a part of said means, means for conditioning said first mentioned means to effect operation of said caging element through the yielding connection, and means for applying a torque to precess the rotor bearing case from the position wherein a perpendicular relation exists between the rotor spin axis and the Cardan ring to compress the yielding connection by said caging element and create a reactive torque against such precession in the frictionally retained member to thereby provide the actual force by which the Cardan ring is moved to a given position about its vertical axis.

2. In a caging device for a Cardan ring supported directional gyroscope having a rotor and rotor bearing case and wherein the Cardan ring is mounted to turn on a vertical axis, a movable member carried by the Cardan ring restrained against rotation about the vertical axis of the ring, a second member movable substantially parallel to the vertical axis of said ring adapted to frictionally engage said first member and to displace said first member in a longitudinal direction, a yielding caging element for the rotor bearing case for applying a torque adapted to move the case to a position wherein the spin axis of the rotor is in perpendicular relation to the Cardan ring, a yielding connection between said first member and the caging element, means for moving said second member to effect operation of said caging element through the displacement of said first member and movement of the yielding connection, and means for initiating the resetting of the Cardan ring by moving the ring against its frictional retention, said last-mentioned means thereby precessing the rotor bearing case from its position wherein a perpendicular relation exists between the rotor spin axis and the Cardan ring to compress the yielding connection by said caging element and create a reactive torque against such precession in the frictionally retained first member to thereby provide the actual force by which the Cardan ring is moved to a desired reset position about its vertical axis.

3. A caging device as claimed in claim 2 in which the means for initiating resetting of the Cardan ring includes a gear mounted on the Cardan ring and a crown gear adapted to mesh with the same secured on a longitudinally movable and rotatable member.

4. In caging and setting mechanism for a Cardan ring mounted directional gyroscope wherein the Cardan ring is mounted to turn on a vertical axis, a rotatable setting member, friction means for resisting rotation of the vertical Cardan ring, means for yieldably caging the gyroscope with its spin axis in a horizontal position, a connection between said caging and a part of said friction means, the Cardan ring being set in azimuth by initiating rotation thereof by the setting member against the action of the friction means to cause precession of the gyroscope resisted by the yielding caging means which through the connection thereof to the friction means provides a reactive torque thereat, the force of which is effective to move the ring in the desired direction.

ROBERT HAYES NISBET.
WILLIAM GEORGE HARDING.